US00RE50936E

(19) United States
(12) Reissued Patent
Barritt

(10) Patent Number: US RE50,936 E
(45) Date of Reissued Patent: *Jun. 23, 2026

(54) SYSTEMS AND METHODS FOR IMPROVING TOLERANCE OF DELAY AND DISRUPTION OF A CONTROL-TO-DATA-PLANE INTERFACE IN A SOFTWARE-DEFINED NETWORK

(71) Applicant: Aalyria Technologies, Inc., Livermore, CA (US)

(72) Inventor: Brian Barritt, San Jose, CA (US)

(73) Assignee: AALYRIA TECHNOLOGIES, INC., Aldie, VA (US)

( * ) Notice: This patent is subject to a terminal disclaimer.

(21) Appl. No.: 16/825,467

(22) Filed: Mar. 20, 2020

Related U.S. Patent Documents

Reissue of:
(64) Patent No.: 9,924,441
Issued: Mar. 20, 2018
Appl. No.: 15/071,969
Filed: Mar. 16, 2016

(51) Int. Cl.
*H04W 40/24* (2009.01)
*H04L 41/0813* (2022.01)
(Continued)

(52) U.S. Cl.
CPC ..... *H04W 40/246* (2013.01); *H04L 41/0813* (2013.01); *H04L 41/0895* (2022.05);
(Continued)

(58) Field of Classification Search
CPC ..... H04W 40/246; H04W 72/0406; H04L 41/12; H04L 41/122; H04L 41/0813; H04L 41/0895
See application file for complete search history.

(56) References Cited

U.S. PATENT DOCUMENTS 8,194,573 B1 * 6/2012 Smith ..... H04L 67/12 370/255
10,374,695 B2 * 8/2019 Barritt ..... H04B 7/18589
(Continued)

FOREIGN PATENT DOCUMENTS

WO 2015085273 A1 6/2015
WO WO-2015/085273 6/2015
(Continued)

*Primary Examiner* — Michael Roswell
(74) *Attorney, Agent, or Firm* — BAKER, HOSTETLER, LLP

(57) ABSTRACT

This disclosure provides systems and methods for improving tolerance of delay and disruption of a control-to-data-plane interface (CDPI) in a software-defined network. A system can include a plurality of moving nodes and an SDN controller communicatively coupled to the plurality of moving nodes. The SDN controller can be configured to send a first control message to a first moving node of the plurality of moving nodes according to a CDPI protocol. The first control message can include instructions for the first moving node to execute a modification of a physical network topology parameter. The SDN controller also can be configured to send a second control message to the first moving node according to the CDPI protocol. The second control message can include instructions for the first moving node to modify routing information stored by the first node based on the modification of the physical network topology parameter.

16 Claims, 6 Drawing Sheets

(51) Int. Cl.

| | |
|---|---|
| ***H04L 41/0895*** | (2022.01) |
| ***H04L 41/122*** | (2022.01) |
| ***H04L 41/40*** | (2022.01) |
| *G08G 5/26* | (2025.01) |
| *H04L 45/64* | (2022.01) |
| *H04W 84/18* | (2009.01) |

(52) U.S. Cl.
CPC ..... *H04L 41/122* (2022.05); *H04L 41/40* (2022.05); *G08G 5/26* (2025.01); *H04L 45/64* (2013.01); *H04W 84/18* (2013.01); *Y04S 40/00* (2013.01)

(56) References Cited

U.S. PATENT DOCUMENTS

| | | | | |
|---|---|---|---|---|
| 2009/0316681 | A1* | 12/2009 | Hehmeyer | H04L 45/00 370/351 |
| 2013/0094366 | A1* | 4/2013 | Lee | H04L 41/14 370/255 |
| 2014/0036747 | A1* | 2/2014 | Nory | H04W 72/0406 370/336 |
| 2014/0098673 | A1* | 4/2014 | Lee | H04L 45/64 370/238 |
| 2014/0153390 | A1 | 6/2014 | Ishii et al. | |
| 2014/0301192 | A1 | 10/2014 | Lee et al. | |

FOREIGN PATENT DOCUMENTS

| | | | |
|---|---|---|---|
| WO | 2015105985 | A1 | 7/2015 |
| WO | WO-2015/105985 | | 7/2015 |

* cited by examiner

SYSTEMS AND METHODS FOR IMPROVING TOLERANCE OF DELAY AND DISRUPTION OF A CONTROL-TO-DATA-PLANE INTERFACE IN A SOFTWARE-DEFINED NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*The present application is a reissue of U.S. Pat. No. 9,924,441, which is herein incorporated by reference as if fully set forth in this description. More than one reissue application has been filed for the reissue of U.S. Pat. No. 9,924,441. The reissue applications are application Ser. Nos. 16/825,467 (the present application) filed Mar. 20, 2020 and 16/825,402 filed Mar. 20, 2020.*

BACKGROUND

Information can be transmitted over directional point-to-point computer networks, such as aerospace and other mobile networks. In such networks, links can be formed between pairs of nodes by aiming transceivers of each node pair towards each other. In some implementations, the network nodes may move over time, which can result in frequent disruption of the links in the network and can require frequent reconfiguration of the links. Typically, a control-to-data-plane interface (CDPI) in a software-defined network (SDN) requires reliable, low-latency links for transmitting control messages to network nodes. However, aerospace networks often do not have such reliable, low-latency links. Furthermore, CDPIs typically do not support messages to alter the physical topology of a directional point-to-point network.

SUMMARY

In some aspects, the disclosure relates to a system for configuring a software-defined network (SDN). The system can include a plurality of moving nodes and an SDN controller communicatively coupled to the plurality of moving nodes. The SDN controller can be configured to send a first control message to a first moving node of the plurality of moving nodes according to a control-to-data-plane interface (CDPI) protocol. The first control message can include instructions for the first moving node to execute a modification of a physical network topology parameter, including at least instructions to cause the first moving node to aim a wireless transceiver towards a second moving node. The SDN also can be configured to send a second control message to the first moving node according to the CDPI protocol. The second control message can include instructions for the first moving node to modify routing information stored by the first moving node based on the modification of the physical network topology parameter.

In some implementations, the SDN controller can be further configured to send the first control message specifying a first future time at which the first moving node is to execute the modification of the physical network topology parameter. In some implementations, the SDN controller can be further configured to send the second control message specifying a second future time, later than the first future time, at which the first moving node is to modify the routing information. In some implementations, the SDN controller can be further configured to receive, from the first moving node, a confirmation message indicating that the modification of the physical network topology parameter and the modification of the routing information stored by the first moving node have both been executed.

In some implementations, the SDN controller can be further configured to receive, from the first moving node, a confirmation message indicating that the modification of the physical network topology parameter has been executed, and to send the second control message responsive to receiving the confirmation message. In some implementations, the first control message can include instructions to cause the first moving node to modify at least one parameter associated with a transmitter of the first moving node. In some implementations, the at least one parameter associated with the transmitter of the first moving node can include at least one of a transmission power, a transmission frequency, and a modulation scheme.

In another aspect, the disclosure relates to a method for configuring a software-defined network (SDN). The method can include sending, by an SDN controller communicatively coupled to a plurality of moving nodes, a first control message to a first moving node of the plurality of moving nodes according to a control-to-data-plane interface (CDPI) protocol. The first control message can include instructions for the first moving node to execute a modification of a physical network topology parameter, including at least instructions to cause the first moving node to aim a wireless transceiver towards a second moving node. The method also can include sending, by the SDN controller, a second control message to the first moving node according to the CDPI protocol. The second control message can include instructions for the first moving node to modify routing information stored by the first moving node based on the modification of the physical network topology parameter.

In some implementations, the method can include sending, by the SDN controller, the first control message specifying a first future time at which the first moving node is to execute the modification of the physical network topology parameter. In some implementations, the method can include sending, by the SDN controller, the second control message specifying a second future time, later than the first future time, at which the first moving node is to modify the routing information. In some implementations, the method can include receiving, by the SDN controller from the first moving node, a confirmation message indicating that the modification of the physical network topology parameter and the modification of the routing information stored by the first moving node have both been executed.

In some implementations, the method can include receiving, by the SDN controller from the first moving node, a confirmation message indicating that the modification of the physical network topology parameter has been executed, and sending, by the SDN controller, the second control message responsive to receiving the confirmation message. In some implementations, sending the first control message can include sending instructions to cause the first moving node to modify at least one parameter associated with a transmitter of the first moving node. In some implementations, sending the first control message can include sending instructions to cause the first moving node to modify at least one of a transmission power, a transmission frequency, and a modulation scheme.

In another aspect, the disclosure relates to a non-transitory computer-readable medium having instructions encoded thereon which, when executed by one or more processors, cause the one or more processors to perform a method for configuring a software-defined network (SDN). The method can include sending, by an SDN controller communicatively coupled to a plurality of moving nodes, a first control message to a first moving node of the plurality of moving nodes according to a control-to-data-plane interface (CDPI) protocol. The first control message can include instructions for the first moving node to execute a modification of a physical network topology parameter, including at least instructions to cause the first moving node to aim a wireless transceiver towards a second moving node. The method also can include sending, by the SDN controller, a second control message to the first moving node according to the CDPI protocol. The second control message can include instructions for the first moving node to modify routing information stored by the first moving node based on the modification of the physical network topology parameter.

In some implementations, the method can include sending, by the SDN controller, the first control message specifying a first future time at which the first moving node is to execute the modification of the physical network topology parameter. In some implementations, the method can include sending, by the SDN controller, the second control message specifying a second future time, later than the first future time, at which the first moving node is to modify the routing information. In some implementations, the method can include receiving, by the SDN controller from the first moving node, a confirmation message indicating that the modification of the physical network topology parameter and the modification of the routing information stored by the first moving node have both been executed.

In some implementations, the method can include receiving, by the SDN controller from the first moving node, a confirmation message indicating that the modification of the physical network topology parameter has been executed, and sending, by the SDN controller, the second control message responsive to receiving the confirmation message. In some implementations, sending the first control message can include sending instructions to cause the first moving node to modify at least one parameter associated with a transmitter of the first moving node. In some implementations, sending the first control message can include sending instructions to cause the first moving node to modify at least one of a transmission power, a transmission frequency, and a modulation scheme.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements.

DETAILED DESCRIPTION

The systems and methods of the disclosure relate to improving tolerance of delay and disruption of a control-to-data-plane interface (CDPI) in a software-defined network. Particularly, the disclosure describes an SDN controller and a CDPI that allows the SDN controller to send control messages to network nodes that may include instructions for the network node to aim a steerable beam antenna at another network node to form a communication link. The SDN controller also can send instructions to a network node relating to a power level to be used for transmitting information, for example based on a distance between the nodes forming the link, or other radio functions such as communication channels to be used for transmitting and receiving data. In addition, the SDN controller can send updated routing information to network nodes, as is done in traditional software-defined networks. In some implementations, the control messages sent by the SDN controller can include scheduling information, which can help to increase the tolerance of a software-defined aerospace network to delay and disruption of network links that may occur during a topology reconfiguration.

Figure 1:
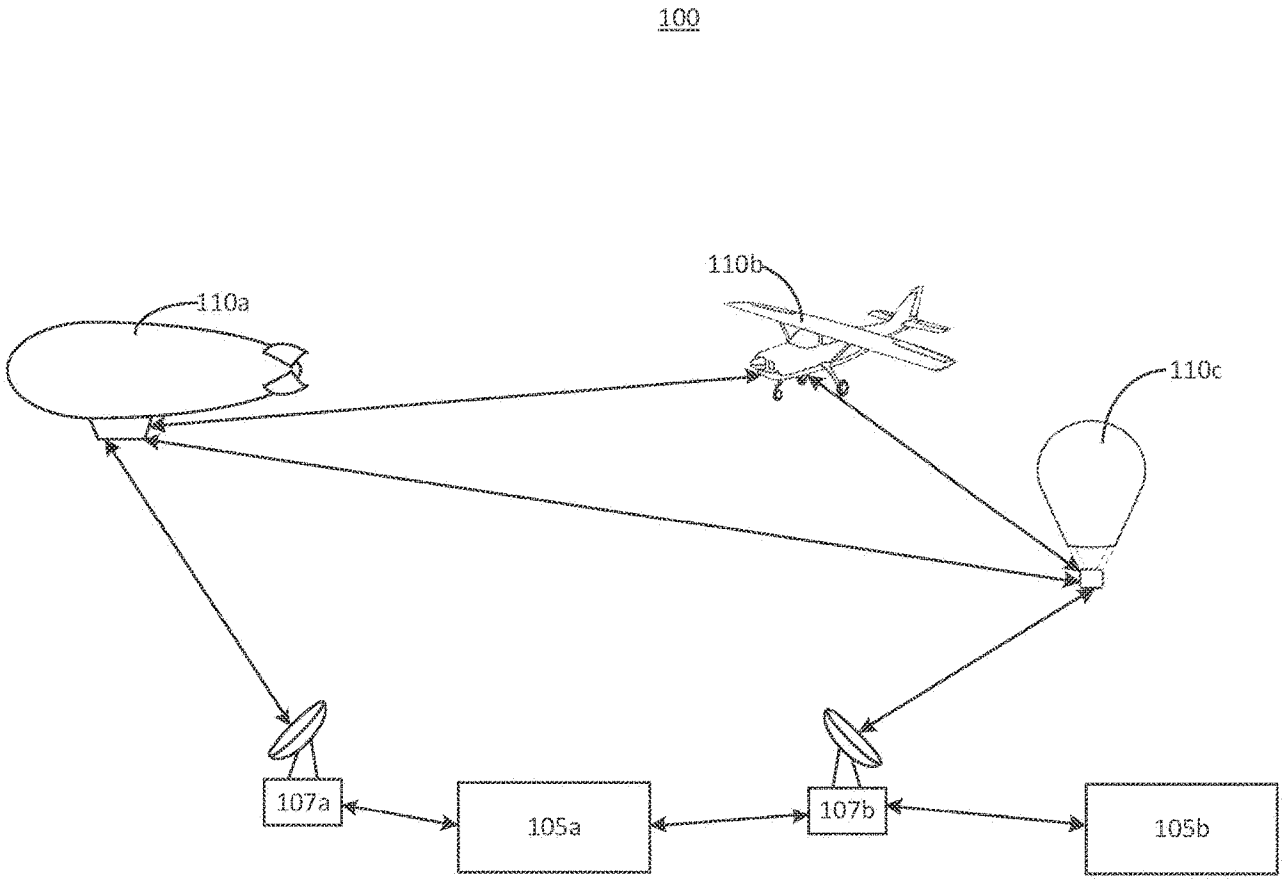
FIG. 1 is a block diagram of an example directional point-to-point computer network.

FIG. 1 is a block diagram of an example directional point-to-point computer network 100. The computer network 100 is a directional point-to-point computer network consisting of nodes mounted on various land- and air-based devices, some of which may change position with respect to other nodes in the network 100 over time. For example, the network 100 includes nodes associated with each of two land-based datacenters 105a and 105b (generally referred to as datacenters 105), nodes associated with each of two ground stations 107a and 107b (generally referred to as ground stations 107), and nodes associated with each of three airborne high altitude platforms (HAPs) 110a-110c (generally referred to as HAPs 110). As shown, the HAP 110a is a blimp, the HAP 110b is an airplane, and the HAP 110c is a balloon. Arrows shown between a pair of nodes represent active communication links between the nodes. It should be understood that the network 100 as shown in FIG. 1 is illustrative only, and in some implementations the network 100 may include additional or different nodes. For example, in some implementations, the network 100 may include additional HAPs, which may be balloons, blimps, airplanes, unmanned aerial vehicles (UAVs), satellites, or any other form of high altitude platform. In some implementations, the network 100 may serve as an access network for client devices such as cellular phones, laptop computers, desktop computers, wearable devices, or tablet computers. The network 100 also may be connected to a larger network, such as the Internet, and may be configured to provide a client device with access to resources stored on or provided through the larger computer network. In some implementations, the HAPs 110 can include wireless transceivers associated with a cellular or other mobile network, such as eNodeB base stations or other wireless access points, such as WiMAX or UMTS access points. Together, the HAPs 110 can form a wireless access network. The HAPs 110 can connect to the datacenters 105, for example, via backbone network links or transit networks operated by third parties. The datacenters 105 may include servers hosting applications that are accessed by remote users as well as systems that monitor or control the components of the network 100. The HAPs 110 can provide wireless access for the users, and can route user requests to the datacenters 105 and return responses to the users via the backbone network links.

In some implementations, the network 100 can be an SDN that is controlled by an SDN controller, which may be located, for example, in one of the datacenters 105. The nodes of the network 100 can be configured to communicate with one another using steerable wireless transceivers. The transceivers may be mounted to actuators that can be controlled to point in a desired direction. To form a link between two nodes, such as the node associated with the HAP 110a and the node associated with the HAP 110a, the transceivers of the respective nodes can be controlled to point in the direction of one another so that data can be sent and received between the nodes. In some implementations, the power of the signals transmitted by each transceiver can also be controlled to facilitate formation of the links in the network 100. For example, nodes that are separated by a relatively large distance can be configured to operate at a higher power to compensate for the reduction in signal-to-noise ratio that occurs over the distance separating the two nodes. Nodes that are spaced nearer to one another may be controlled to operate at a relatively lower power so as to save power.

As the HAPs 110 move with respect to one another and with respect to the datacenters 105 and ground stations 107 over time, some of the links shown in the block diagram of FIG. 1 may become infeasible. For example, the link between the ground station 107a and the HAP 110a may not be feasible when the path of the HAP 110a brings the HAP 110a into a position in which it is out of range of the ground station 107a, or in which the earth is positioned between it and the ground station 107a. Thus, due to the continuous movement of the HAPs 110, the topology of the network 100 may require regular or irregular reconfiguration to maintain connectivity to satisfy provisioned network flows.

Generally, traditional CDPI implementations such as OpenFlow do not include support for control messages that include instructions for steering wireless transceivers or for controlling transmitter parameters, such as transmission power, frequency, and modulation scheme. Accordingly, an SDN controller that uses a traditional CDPI may not be able to control the nodes of the network 100 to reconfigure the topology of the network 100. Furthermore, most CDPIs require network links that are highly reliable and exhibit low latency. Due to the continuous movement of the HAPs 110, as well as the relatively large distances between nodes in the network 100, the network 100 may not exhibit the reliability and low latency required by typical CDPIs. As a result, it can be difficult to effectively manage the network 100 over time using a traditional SDN controller and CDPI. To address this issue, an SDN controller and CDPI can be configured to support control messages including instructions for network nodes to modify topology parameters, for example by reconfiguring their steerable wireless transceivers or by adjusting the power output of their transceivers. In addition, control messages can include instructions for a network node to execute topology and routing changes at specified times in the future, which can help to compensate for the delays or disruptions that may occur when attempting to form new links in a directional point-to-point network such as the network 100.

Figure 2:
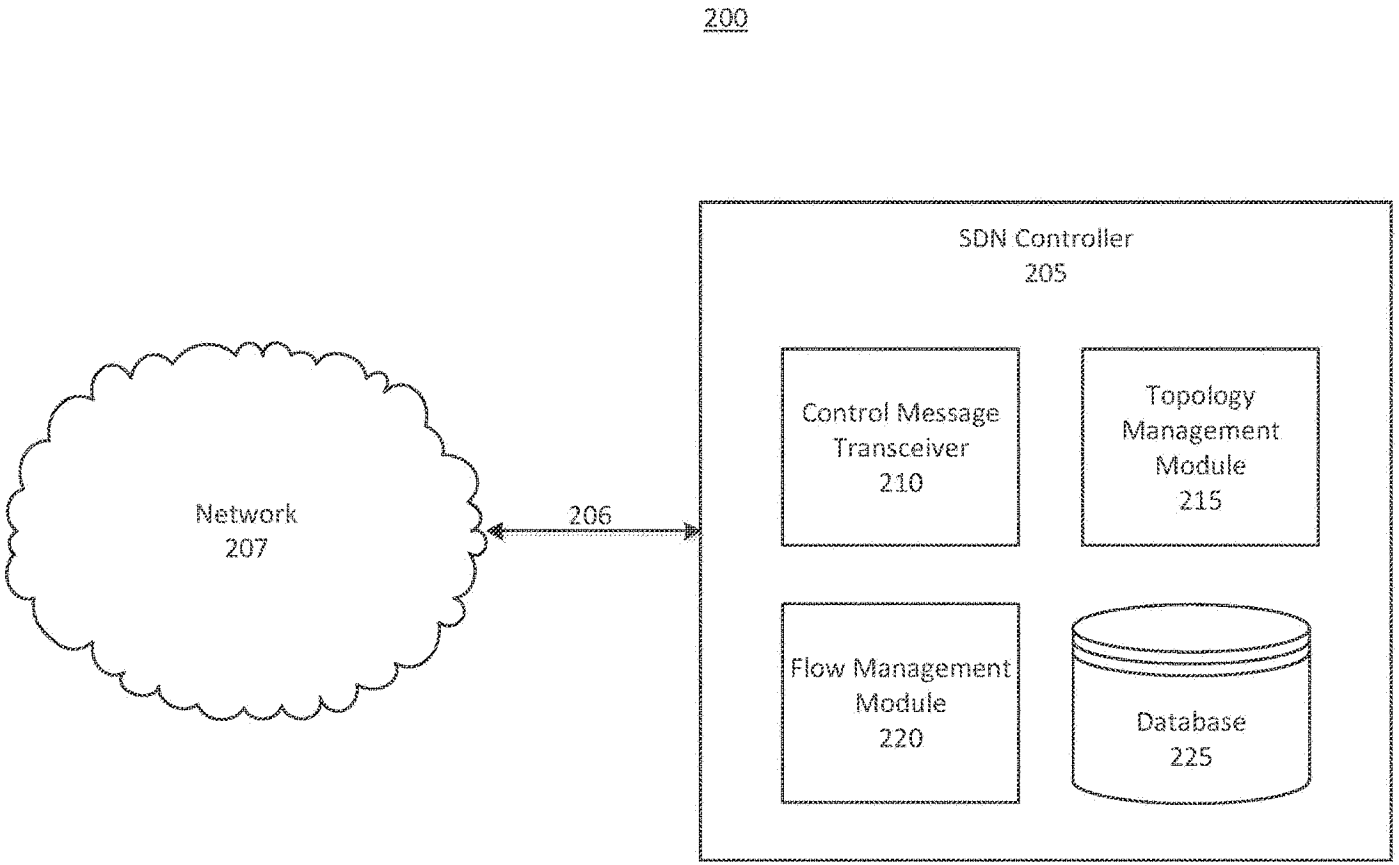
FIG. 2 is a block diagram of an example system for configuring a computer network.

FIG. 2 is a block diagram of an example system 200 for configuring a computer network. The system 300 includes an SDN controller 205 in communication with a network 207. The SDN controller 205 communicates with the network 207 via a CDPI 206. In some implementations, the network 207 may be or may include a directional point-to-point network having one or more nodes that move relative to other nodes over time, similar to the network 100 shown in FIG. 1. The SDN controller 205 may be any type of computing device capable of sending control messages to the network 207 to configure the topology of the network 207 and to pass routing information to the nodes of the network 207. Although the SDN controller 205 is shown as a component separate from the network 207, it should be understood that in some implementations, the network controller 205 may be part of the network 207. The network controller 205 includes a control message transceiver 210, a topology management module 215, a flow management module 220, and a database 225.

In some implementations, the control message transceiver 210 can send control messages to the nodes of the network 207, and can receive responses to control messages from the nodes. Control messages sent to a network node can include instructions for the network node to reconfigure topology parameters. For example, the control message transceiver 210 can send instructions to a node that causes the node to aim a steerable beam antenna at another network node to form a communication link. In some implementations, the control message transceiver 210 can send instructions to a network node relating to the functionality of the transmitter used by the node to communicate with other nodes, such as a power level, a frequency, or a modulation scheme to be used by the node for transmitting information. In addition, the control message transceiver 210 can send updated routing information to the nodes of the network 207, as is done in traditional software-defined networks.

As discussed above, reconfiguring the network 207 can cause temporary delay and disruption of network links as the nodes steer their transceivers to form new links. To increase the tolerance of the network 207 to such delay and disruption, the control message transceiver 210 can be configured to send control messages that include scheduling information. When the control message transceiver 210 instructs a node to break a first link and to instead establish a second link, there may be a significant delay between the breaking of the first link and the establishment of the second link. During this delay, the control plane (and the data plane) can be disrupted and will remain disrupted until the new link is formed and routing information for the new link is stored by the nodes of the network 207. In some cases, this disruption could cause the network node to become stranded. To avoid stranding the network node, the control message transceiver 210 can instruct the node to establish the second link at a first scheduled time, and to update its routing information at a later time. The network node can receive these instructions and execute them autonomously according to the scheduling information associated with the instructions, even while the control plane is disrupted. An example of this is described further below in connection with FIGS. 3A-3C.

In some implementations, the control message transceiver 210 can be configured to wait for confirmation from a network node that a first network topology modification has been executed before sending instructions for a second network topology modification that is dependent on the first network control modification. For example, the control message transceiver 210 may instruct a node to form a new link by aiming its transceiver at another node. Then, before sending updated routing information corresponding to the new link, the control message transceiver 210 can wait for an acknowledgment from the node to confirm that the new link has been formed. After confirmation has been received, the control message transceiver 210 can instruct the network nodes to update their routing information accordingly. In some implementations, if the SDN controller does not receive confirmation that the new link was formed, a new topology can be selected instead. An example of this is described further below in connection with FIGS. 4A-4C.

The topology management module 215 can be configured to determine the current topology of the network 207. In some implementations, the determination can be made based on information received from the network nodes 207. For example, the topology management module 215 can be configured to receive information from each node in the network 207 corresponding to the links currently formed by each node, and can aggregate this information to determine a complete topology of the network 207, including any failed links that may exist within the network 207. In some implementations, the this information can be stored in the database 225.

The flow management module 220 can be configured to determine all of the flows that are currently provisioned in the network 207. In some implementations, the flow management module 220 can determine the provisioned flows based on information received from network applications or from a separate traffic engineering application. In some implementations, the flow management module 220 can aggregate the application data to determine the total amount of bandwidth required between each node pair in the network 207. This information can be stored, for example, in the database 225. Together, the topology management module 215 and the flow management module 220 can be configured to determine alternative topologies that may better facilitate processing of the provisioned network flows. When it is determined that a new topology may be desirable, the control message transceiver 210 can be configured to send control messages including instructions for the nodes of the network 207 to modify topology parameters and routing information to achieve the new topology. As discussed above, such control messages also may be associated with scheduling information that can help the network 207 to accommodate delay and disruption that may occur as a result of implementing the topology and routing changes.

Figure 3B:
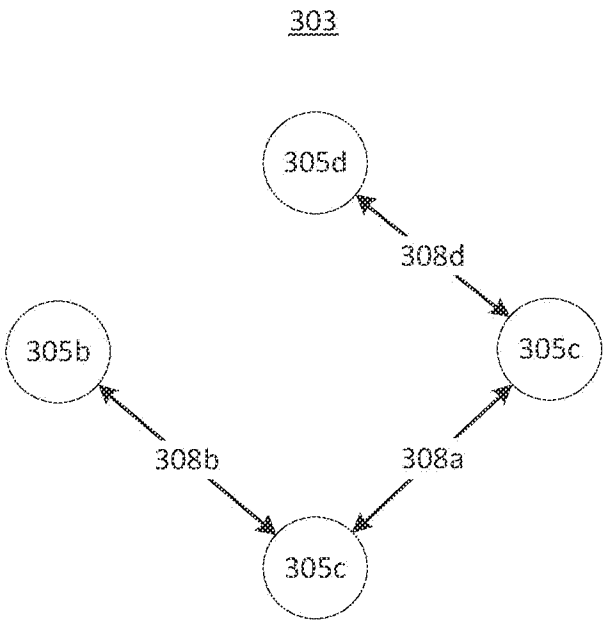
FIG. 3B is a block diagram of the example computer network shown in FIG. 3A having a reconfigured network topology.
Figure 3A:
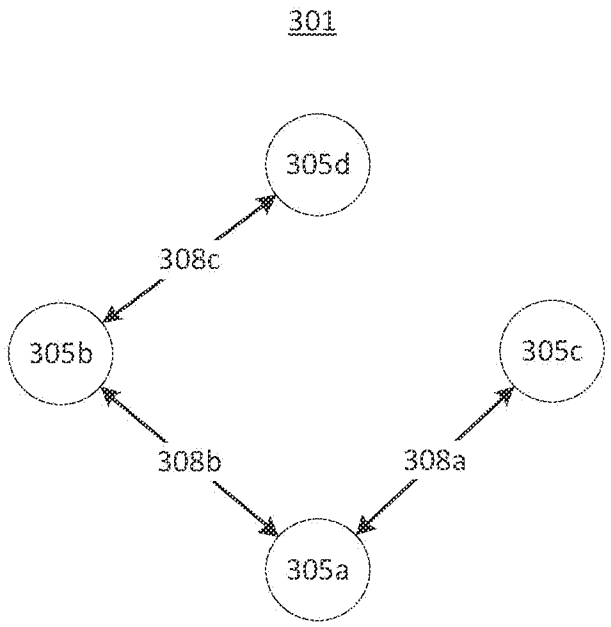
FIG. 3A is a block diagram of an example computer network having a first topology.
Figure 3C:
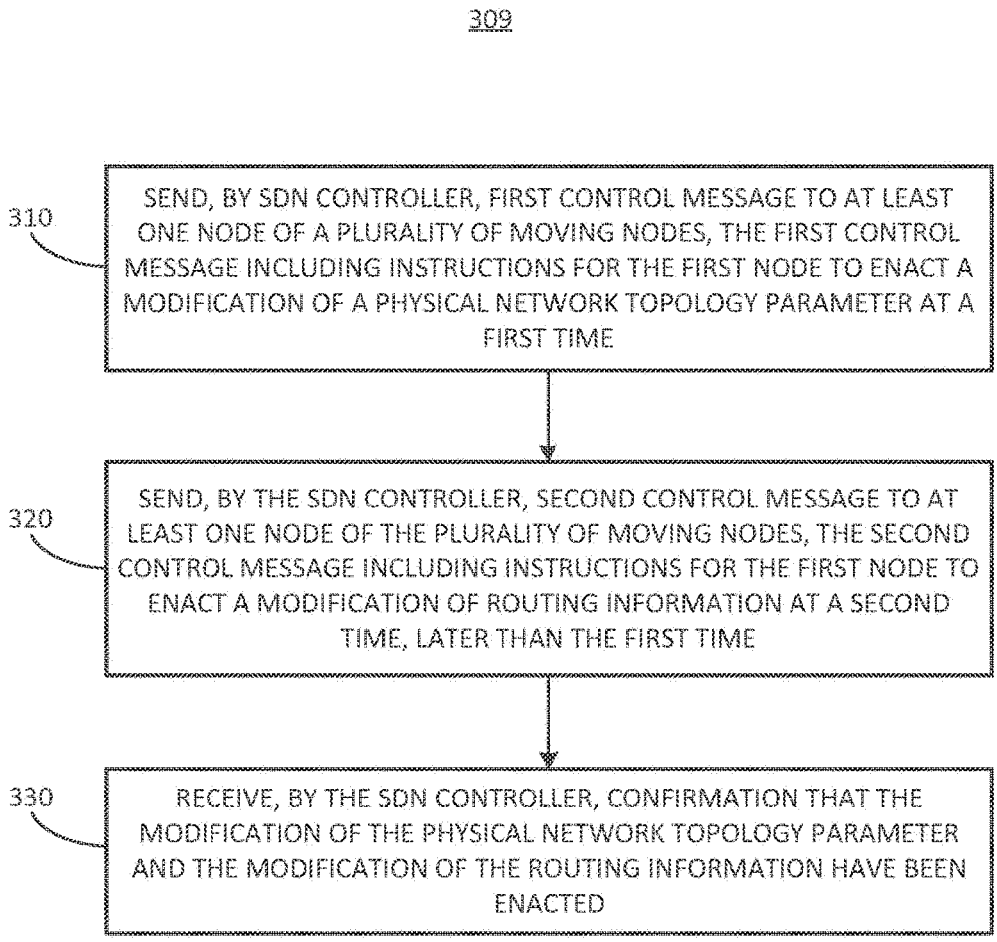
FIG. 3C is a flowchart of an example method for reconfiguring the computer network having the topology shown in FIG. 3A to achieve the topology shown in FIG. 3B.

FIG. 3A is a block diagram of an example computer network having a first topology 301. FIG. 3B is a block diagram of the example computer network shown in FIG. 3A having a reconfigured network topology 303. FIG. 3C is a flowchart of an example method for reconfiguring the computer network shown in FIG. 3A to achieve the topology 303 shown in FIG. 3B. FIGS. 3A-3C are described together below.

Referring now to FIG. 3A, a computer network topology 301 includes four nodes 305a-305d (generally referred to as nodes 305). The nodes 305 are coupled to one another by three links 308a-308c (generally referred to as links 308). In particular, the node 305a is coupled to the node 305c via link 308a, the node 305a is coupled to the node 305b via the link 308b, and the node 305b is coupled to the node 305d via the link 308c. In this example, it is assumed that the node 305d has only a single wireless transceiver and therefore can only form a single link with at most one other node 305.

Referring to FIG. 3B, the topology 303 includes the same nodes 305a-305d that are shown in FIG. 3A, but the link 308c that joins the node 305b and the node 305d in FIG. 3A is removed and replaced with the link 308d which joins the nodes 305c and 3085d as shown in FIG. 3B. Because the node 305d has only a single wireless transceiver, there is no way to reconfigure the topology 301 of FIG. 3A to achieve the topology 303 of FIG. 3B in a "hitless" manner (i.e., without temporarily disrupting the network while the transceiver of node 305d is steered away from the node 305b and towards the node 305c to form the link 308d with the node 305c. As a result, the control plane will become disrupted immediately after the link 308c is broken in order to establish the link 308d, and it will remain disrupted until the link 308d is formed and routing information corresponding to the new link 308d has been updated on the network nodes 305.

In some implementations, the disruption described above could result in the node 305d becoming stranded (i.e., unreachable from every other node 305). For example, a first control message may be sent to the node 305d to cause the node 305d to steer its antenna away from the node 305b and towards the node 305d in order to form the new link 308d. If a second control message is sent to the node 305d before the link 308d has been established (or to any other node along a path that may include the link 308d), the second control message may not reach its intended destination and the routing modification associated with the second control message will never be executed, which can lead to stranding of the network node 305d. To reduce the likelihood of such an event, control messages can include scheduling information specifying a time at which they should be executed. The node 305d can be configured to receive such control messages, and to execute them autonomously at the specified times even while the control plane is disrupted, which can help to reduce the likelihood of the node 305d becoming stranded. This example is described further below in connection with FIG. 3C.

FIG. 3C is a flowchart of an example method 309 for reconfiguring the computer network having the topology 301 shown in FIG. 3A to achieve the topology 303 shown in FIG. 3B. In brief overview, the method 309 includes sending, by an SDN controller, a first control message to at least one node of a plurality of moving nodes (stage 310). The first control message includes instructions for the first node to execute a modification of a physical network topology parameter at a first time. The method 309 further includes sending, by the SDN controller, a second control message to the at least one moving node of the plurality of moving nodes (stage 320). The second control message includes instructions for the first node to execute a modification of routing information at a second time, later than the first time. The method 309 further includes receiving, by the SDN controller, confirmation that the modification of the physical network topology parameter and the modification of the routing information have been executed (stage 330).

Referring again to FIGS. 3A-3C, the method 309 includes sending, by an SDN controller, a first control message to at least one node of a plurality of moving nodes (stage 310). The first control message includes instructions for the first node to execute a modification of a physical network topology parameter at a first time. In the above example, the first control message can be sent to the node 305d. The first control message can include instructions for the node 305d to steer its transceiver towards the node 305c, and also can include instructions specifying a time at which the node 305d should execute this topology modification.

The method 309 includes sending, by the SDN controller, a second control message to the at least one moving node of the plurality of moving nodes (stage 320). The second control message includes instructions for the first node to execute a modification of routing information at a second time, later than the first time. In the example above, the second control message also can be sent to the node 305d. The routing modification instructions included in the second control message can correspond to the topology modification instructions included in the first control message. For example, the routing modification instructions included in the second control message can establish a new route from the node 305d to the node 305c via the link 308d, and can delete the route from the node 305d to the node 305b via the link 308c. In some implementations, the second control message can be sent before the topology 301 of FIG. 3A has been modified (i.e., before the first time at which the topology modification instructions included in the first control message are to be executed), ensuring that the second control message can be received by the node 305d before the control plane is disrupted. The second control message can include instructions specifying a second time at which the node 305d should execute the routing modification, which can be later than the first time at which the node 305d is to execute the topology modification. Scheduling the topology and routing modifications in this way can allow the node 305d to complete the topology modification before attempting to update the corresponding routing information, and both modifications can be executed autonomously by the node 305d, thereby reducing the likelihood of the node 305d becoming stranded due to the disruption of the control plane that occurs when the link 308c is broken. In some implementations, the difference between the first time and the second time can be based on the estimated time required for the node 305d to execute the topology modification instructions included in the first control message.

The method 309 includes receiving, by the SDN controller, confirmation that the modification of the physical network topology parameter and the modification of the routing information have been executed (stage 330). In the above example, the node 305d can send a confirmation message to the SDN controller indicating the modification instructions associated with the first and second control messages have been executed. The SDN controller can therefore determine that the network node 305d is not stranded, and can then instruct the other nodes 305 in the network to update their routing information accordingly (e.g., to account for the removal of the link 308c and the establishment of the new link 308d).

Figure 4B:
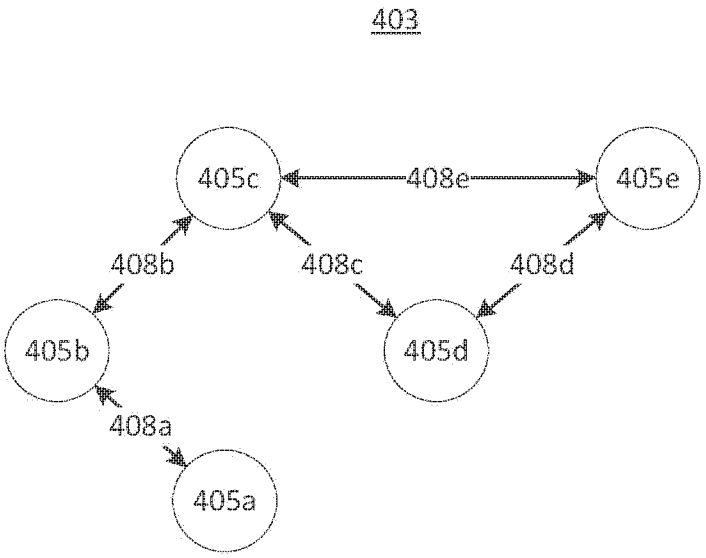
FIG. 4B is a block diagram of the example computer network shown in FIG. 4A having a reconfigured network topology.
Figure 4A:
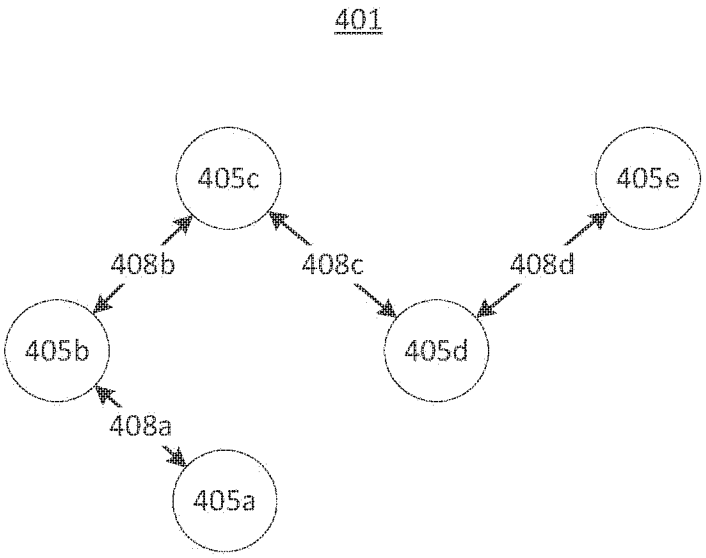
FIG. 4A is a block diagram of an example computer network having a first topology.
Figure 4C:
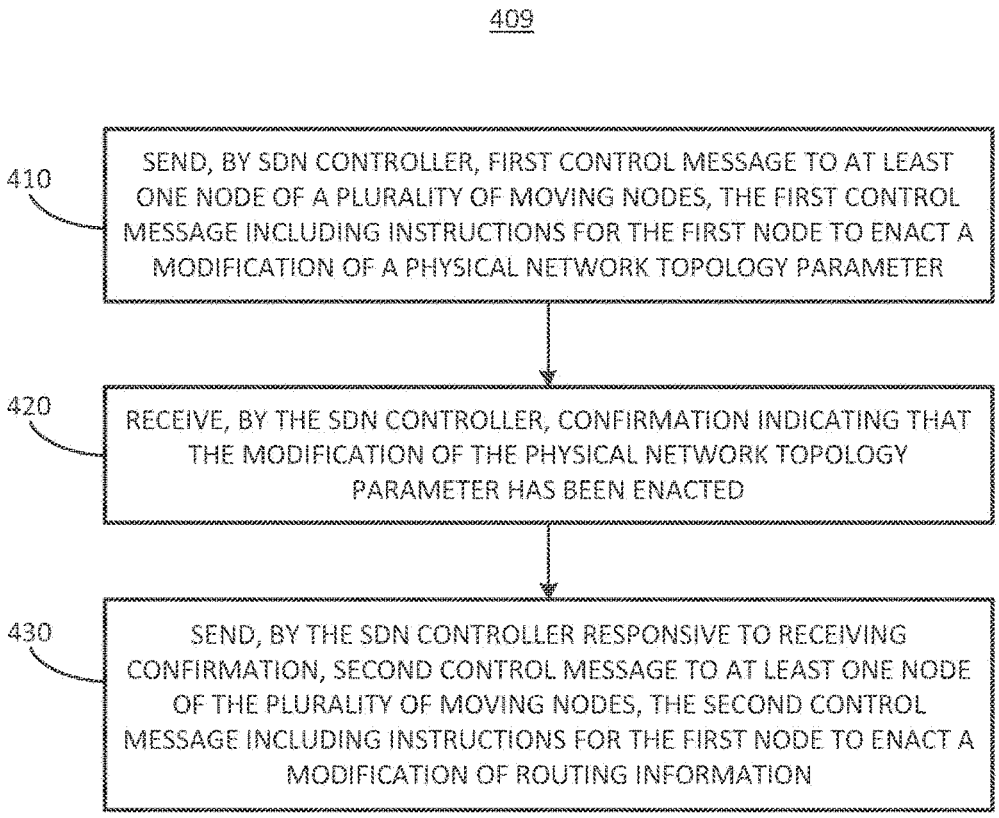
FIG. 4C is a flowchart of an example method for reconfiguring the computer network having the topology shown in FIG. 4A to achieve the topology shown in FIG. 4B.

FIG. 4A is a block diagram of an example computer network having a first topology 401. FIG. 4B is a block diagram of the example computer network shown in FIG. 4A having a reconfigured network topology 403. FIG. 4C is a flowchart of an example method for reconfiguring the computer network shown in FIG. 4A to achieve the topology 403 shown in FIG. 4B. FIGS. 4A-4C are described together below.

Referring now to FIG. 4A, a computer network topology 401 includes five nodes 405a-405e (generally referred to as nodes 405). The nodes 405 are coupled to one another by three links 408a-408d (generally referred to as links 408). In particular, the node 405a is coupled to the node 405b via the link 408a, the node 405b is coupled to the node 405c via the link 308b, the node 405c is coupled to the node 405d via the link 408c, and the node 405d is coupled to the node 405e via the link 405e. In the example that follows, it is assumed that each of the nodes 405c, 405d, and 405e have three wireless transceivers, and therefore each of these nodes 405c, 405d, and 405e can form a link with up to three other nodes 405.

Referring to FIG. 4B, the topology 403 includes the same nodes 405a-405e and the same links 408a-408e that are shown in FIG. 4A, but also include the addition of the link 408e that joins the node 405c and the node 405e. In some implementations, the new link 408e can allow for more efficient transmission of information from node 405a to node 405e, for example by using the route 405a-405b-405c-405e instead of the longer route 405a-405b-405c-405d-405e.

In this example, the new link 408e can be established in a "hitless" manner, because each of the nodes 405c and 405e that are joined by the new link 408e have at least one unused transceiver. As a result, unlike in the example discussed above in connection with FIG. 3A-3C, it can be possible to establish the new link 408e without disrupting the control plane. To ensure that this change is hitless, the SDN controller can confirm that the new link 408e has been successfully established before sending control messages to the network nodes 405 to cause the nodes to update their routing information to include the new route 405a-405b-405c-405d-405e, because use of the new route is dependent upon the establishment of the new link 408e. This example is described further below in connection with FIG. 4C.

FIG. 4C is a flowchart of an example method 409 for reconfiguring the computer network having the topology 401 shown in FIG. 4A to achieve the topology 403 shown in FIG. 4B. In brief overview, the method 409 includes sending, by an SDN controller, a first control message to at least one node of a plurality of moving nodes (stage 410). The first control message includes instructions for the first node to execute a modification of a physical network topology parameter. The method 409 further includes receiving, by the SDN controller, confirmation that the modification of the physical network topology parameter has been executed (stage 420), and sending, by the SDN controller responsive to receiving the confirmation, a second control message to the at least one moving node of the plurality of moving nodes (stage 430). The second control message includes instructions for the first node to execute a modification of routing information.

Referring again to FIGS. 4A-4C, the method 409 includes sending, by an SDN controller, a first control message to at least one node of a plurality of moving nodes (stage 410). The first control message includes instructions for the first node to execute a modification of a physical network topology parameter. In the above example, the first control message can be sent to the nodes 405c and 405e. The first control message can include instructions for each of the nodes 405c and 405e to steer their respective transceivers towards one another and to update any transceiver parameters, such as output power, frequency, and modulation scheme, to allow for the establishment of the new link 408e.

The method 409 includes receiving, by the SDN controller, confirmation that the modification of the physical network topology parameter has been executed (stage 420). In the above example, each of the nodes 405c and 405e can be configured to send a response to the SDN controller indicating that the nodes 405c and 405e have implemented the network topology changes that were specified in their respective control messages. After the SDN controller receives confirmation messages from both of the nodes 405c and 405e, the SDN controller can determine that the new link 408e has been established and is ready to be used for routing information in the network.

The method 409 includes sending, by the SDN controller responsive to receiving the confirmation, a second control message to the at least one moving node of the plurality of moving nodes (stage 430). The second control message includes instructions for the first node to execute a modification of routing information. In the above example, the SDN controller can determine that the link 408e is ready for use after it has received the confirmation messages from both of the nodes 405c and 405e. The SDN controller can then send control messages to the nodes 405c and 405e (as well as the other nodes 405) indicating that the new, more efficient route 405a-405b-405c-405e should be preferred over the old, less efficient route 405a-405b-405c-405d-405e.

In some implementations, if the SDN controller does not receive the confirmation messages from one of the nodes 405c and 405e, the SDN controller can determine that the new link 408e has not been established. As a result, the SDN controller will not send updated routing information corresponding to any route that requires the link 408e. In some implementations, the SDN controller can attempt to resend the control messages including instructions for each of the nodes 405c and 405e to steer their respective transceivers towards one another, and again wait for confirmation from both nodes that these changes have been executed before sending updated routing information to the nodes 405.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

[1. A system for configuring a software-defined network (SDN), the system comprising:

a plurality of moving nodes; and an SDN controller communicatively coupled to the plurality of moving nodes, wherein the SDN controller is configured to:

send a first control message to a first moving node of the plurality of moving nodes according to a control-to-data-plane interface (CDPI) protocol, the first control message including instructions for the first moving node to execute a modification of a physical network topology parameter, including at least instructions to cause the first moving node to aim a wireless transceiver towards a second moving node; and send a second control message to the first moving node according to the CDPI protocol, the second control message including instructions for the first moving node to modify routing information stored by the first moving node based on the modification of the physical network topology parameter.]

[2. The system of claim 1, wherein the SDN controller is further configured to send the first control message specifying a first future time at which the first moving node is to execute the modification of the physical network topology parameter.]

[3. The system of claim 2, wherein the SDN controller is further configured to send the second control message specifying a second future time, later than the first future time, at which the first moving node is to modify the routing information.]

[4. The system of claim 1, wherein the SDN controller is further configured to receive, from the first moving node, a confirmation message indicating that the modification of the physical network topology parameter and the modification of the routing information stored by the first moving node have both been executed.]

[5. The system of claim 1, wherein the SDN controller is further configured to:

receive, from the first moving node, a confirmation message indicating that the modification of the physical network topology parameter has been executed; and send the second control message responsive to receiving the confirmation message.]

[6. The system of claim 1, wherein the first control message includes instructions to cause the first moving node to modify at least one parameter associated with a transmitter of the first moving node.]

[7. The system of claim 6, wherein the at least one parameter associated with the transmitter of the first moving node includes at least one of a transmission power, a transmission frequency, and a modulation scheme.]

[8. A method for configuring a software-defined network (SDN), the method comprising:

sending, by an SDN controller communicatively coupled to a plurality of moving nodes, a first control message to a first moving node of the plurality of moving nodes according to a control-to-data-plane interface (CDPI) protocol, the first control message including instructions for the first moving node to execute a modification of a physical network topology parameter, including at least instructions to cause the first moving node to aim a wireless transceiver towards a second moving node; and sending, by the SDN controller, a second control message to the first moving node according to the CDPI protocol, the second control message including instructions for the first moving node to modify routing information stored by the first moving node based on the modification of the physical network topology parameter.]

[9. The method of claim 8, wherein the method further comprises sending, by the SDN controller, the first control message specifying a first future time at which the first moving node is to execute the modification of the physical network topology parameter.]

[10. The method of claim 9, wherein the method further comprises sending, by the SDN controller, the second control message specifying a second future time, later than the first future time, at which the first moving node is to modify the routing information.]

[11. The method of claim 8, wherein the method further comprises receiving, by the SDN controller from the first moving node, a confirmation message indicating that the modification of the physical network topology parameter and the modification of the routing information stored by the first moving node have both been executed.]

[12. The method of claim 8, wherein the method further comprises:

receiving, by the SDN controller from the first moving node, a confirmation message indicating that the modification of the physical network topology parameter has been executed; and sending, by the SDN controller, the second control message responsive to receiving the confirmation message.]

[13. The method of claim 8, wherein sending the first control message includes sending instructions to cause the first moving node to modify at least one parameter associated with a transmitter of the first moving node.]

[14. The method of claim 13, wherein sending the first control message includes sending instructions to cause the first moving node to modify at least one of a transmission power, a transmission frequency, and a modulation scheme.]

[15. A non-transitory computer-readable medium having instructions encoded thereon which, when executed by one or more processors, cause the one or more processors to perform a method for configuring a software-defined network (SDN), the method comprising:

sending, by an SDN controller communicatively coupled to a plurality of moving nodes, a first control message to a first moving node of the plurality of moving nodes according to a control-to-data-plane interface (CDPI) protocol, the first control message including instructions for the first moving node to execute a modification of a physical network topology parameter, including at least instructions to cause the first moving node to aim a wireless transceiver towards a second moving node; and sending, by the SDN controller, a second control message to the first moving node according to the CDPI protocol, the second control message including instructions for the first moving node to modify routing information stored by the first moving node based on the modification of the physical network topology parameter.]

[16. The non-transitory computer-readable medium 15, wherein the method further comprises sending, by the SDN controller, the first control message specifying a first future time at which the first moving node is to execute the modification of the physical network topology parameter.]

[17. The non-transitory computer-readable medium of claim 16, wherein the method further comprises sending, by the SDN controller, the second control message specifying a second future time, later than the first future time, at which the first moving node is to modify the routing information.]

[18. The non-transitory computer-readable medium of claim 15, wherein the method further comprises receiving, by the SDN controller from the first moving node, a confirmation message indicating that the modification of the physical network topology parameter and the modification of the routing information stored by the first moving node have both been executed.]

[19. The non-transitory computer-readable medium of claim 15, wherein the method further comprises:

receiving, by the SDN controller from the first moving node, a confirmation message indicating that the modification of the physical network topology parameter has been executed; and sending, by the SDN controller, the second control message responsive to receiving the confirmation message.]

[20. The non-transitory computer-readable medium of claim 15, wherein sending the first control message includes sending instructions to cause the first moving node to modify at least one parameter associated with a transmitter of the first moving node.]

[21. The non-transitory computer-readable medium of claim 20, wherein sending the first control message includes sending instructions to cause the first moving node to modify at least one of a transmission power, a transmission frequency, and a modulation scheme.]

*22. A system comprising:*

*a network controller configured to:*

*receive information from a plurality of nodes of a network, the plurality of nodes including one node that is in motion relative to another node;*

*determine a topology of the network for a given point in time based on the received information, the topology indicating which links between nodes in the network are possible and which are not possible;*

*determine a plurality of flows for the determined topology based on client data information to be transmitted through the network, each of the plurality of flows comprising one or more requirements for a routing path through the network;*

*generate instructions regarding a plurality of links to form for the determined topology based on based on the determined plurality of flows, the plurality of links being a set of the possible links in the topology of the network; and*

*send the generated instructions to at least one node of the plurality of nodes of the network to cause the at least one node to form one or more of the plurality of links at the given point in time,*

*wherein the generated instructions include routing information through the plurality of links;*

*wherein the network controller is configured to send the generated instructions in at least two parts, and*

*wherein a first part of the generated instructions is sent before a second part, and the second part of the generated instructions is sent after confirmation is received at the network controller that the first part of the generated instructions has been executed.*

*23. The system of claim 22, further comprising the plurality of nodes.*

*24. The system of claim 22, wherein the plurality of nodes includes one or more high-altitude platforms.*

*25. The system of claim 22, wherein the plurality of nodes is configured to communicate with one another using steerable wireless transceivers.*

*26. The system of claim 22, wherein the generated instructions include a first point in time scheduled for forming the one or more of the plurality of links and a second point in time scheduled for the routing information.*

*27. The system of claim 22, wherein the network controller is configured to send the generated instructions in at least two parts,*

*wherein a first part of the generated instructions is sent to a first node of the network and a second part of the generated instructions is sent to a second node of the network.*

*28. The system of claim 22, wherein the generated instructions are sent prior to a scheduled time or time frame during which the one or more of the plurality of links is to be formed.*

*29. The system of claim 22, wherein the generated instructions sent to the at least one node cause the at least one node to steer one or more transceivers to form the one or more of the plurality of links.*

*30. The system of claim 22, wherein the network controller is further configured to:*

*determine that a confirmation that the generated instructions have been executed has not been received; and*

*determine a new topology of the network for the given point in time.*

*31. A method comprising:*

*receiving, by one or more processors, information from a plurality of nodes of a network, the plurality of nodes including one node that is in motion relative to another node;*

*determining, by the one or more processors, a topology of the network for a given point in time based on the received information, the topology indicating which links between nodes in the network are possible and which are not possible;*

*determining, by the one or more processors, a plurality of flows for the determined topology based on client data information to be transmitted through the network, each of the plurality of flows comprising one or more requirements for a routing path through the network;*

*generating, by the one or more processors, instructions regarding a plurality of links to form for the determined topology based on the determined plurality of flows, the plurality of links being a set of the possible links in the topology of the network; and*

*sending, by the one or more processors, the generated instructions to at least one node of the plurality of nodes of the network to cause the at least one node to form one or more of the plurality of links at the given point in time,*

*wherein the generated instructions include routing information through the plurality of links;*

*wherein the sending of the generated instructions includes:*

*sending a first part of the generated instructions;*

*receiving confirmation that the first part of the generated instructions has been executed; and*

*sending a second part of the generated instructions.*

*32. The method of claim 31, wherein the plurality of nodes includes one or more high-altitude platforms.*

*33. The method of claim 31, wherein the plurality of nodes is configured to communicate with one another using steerable wireless transceivers.*

*34. The method of claim 31, wherein the generated instructions include a first point in time scheduled for forming the one or more of the plurality of links and a second point in time scheduled for the routing information.*

*35. The method of claim 31, wherein the sending of the generated instructions includes:*

*sending a first part of the generated instructions a first node of the network; and*

*sending a second part of the generated instructions to a second node of the network.*

*36. The method of claim 31, wherein the sending of the generated instructions is performed prior to a scheduled time or time frame during which the one or more of the plurality of links is to be formed.*

*37. The method of claim 31, wherein the generated instructions cause the at least one node to steer one or more transceivers to form the one or more of the plurality of links.*

* * * * *